United States Patent [19]

Galland

[11] Patent Number: 4,608,262
[45] Date of Patent: Aug. 26, 1986

[54] METHOD OF MAKING FROZEN POTATO PATTIES AND THE PRODUCTS FORMED THEREBY

[75] Inventor: Sherry A. Galland, Caldwell, Id.

[73] Assignee: J. R. Simplot Company, Boise, Id.

[21] Appl. No.: 688,574

[22] Filed: Jan. 3, 1985

[51] Int. Cl.⁴ .............................................. A23L 1/217
[52] U.S. Cl. .................................... 426/243; 426/441; 426/637
[58] Field of Search ............... 426/241, 242, 243, 637, 426/438, 441, 509, 510, 808

[56] References Cited

U.S. PATENT DOCUMENTS

| | | | |
|---|---|---|---|
| 3,355,299 | 11/1967 | McLaughlin et al. | 426/441 |
| 3,410,702 | 11/1968 | Frank | 426/637 |
| 3,597,239 | 8/1971 | Vahlsing | 426/441 X |
| 3,988,484 | 10/1976 | Shatila | 426/637 X |
| 4,007,292 | 2/1977 | Shatila et al. | 426/637 |
| 4,135,004 | 1/1979 | Finkel | 426/637 X |
| 4,219,575 | 8/1980 | Saunders et al. | 426/438 X |
| 4,276,314 | 6/1981 | Andersen | 426/637 X |
| 4,317,842 | 3/1982 | El-Hag et al. | 426/438 X |
| 4,419,375 | 12/1983 | Willard et al. | 426/637 X |

FOREIGN PATENT DOCUMENTS 2603141  8/1976  Fed. Rep. of Germany ...... 426/637

Primary Examiner—Arthur L. Corbin
Attorney, Agent, or Firm—Fulwider, Patton, Rieber, Lee & Utecht

[57] ABSTRACT

This invention is a method of making frozen potato patties which can be final cooked in a wide variety of ways to provide potato patties having excellent taste and texture and handling characteristics. The processing comprises cutting up fresh potatoes into relatively large chunks with a minimum dimension of about ¼ inch, cooking the chunks in water or steam at about 170°–220° F., cooking the partially cooked chunks in oil at about 300°–375° F., mixing the chunks with an aqueous solution of starches or gums, forming into a patty and then freezing. For patties which are to be final cooked by microwave heating or by toasting, it is preferred to further oil cook the patties after forming and then freeze them or, alternately, to freeze the patties after forming, further cook them in oil and then refreeze them.

23 Claims, 2 Drawing Figures

METHOD OF MAKING FROZEN POTATO PATTIES AND THE PRODUCTS FORMED THEREBY

BACKGROUND OF THE INVENTION

This invention relates to a method of forming potato patties and to the improved potato patties formed thereby.

Current commercially available frozen potato patties are usually prepared by peeling potatoes, cutting them into strips, cooking the strips in water or steam, optionally drying the strips to remove any surface moisture, further cutting the strips into much smaller pieces, mixing the small, cut up pieces of potatoes with other ingredients such as flavorings and binders, forming the mixture into a patty, cooking the formed patty in oil and then freezing the patty. The frozen patties are finally cooked for consumption by baking, deep frying or grilling. Although these frozen potato patties are satisfactory in many respects, they tend to become very rubbery when final cooked in a microwave oven and when toasted in a toaster they tend to seep excessive amounts of oil. Moreover, because the potatoes are cut up so finely, usually much less than ¼ inch in maximum dimension, much of the potato flavor is lost.

Notwithstanding the success of the frozen potato patties now in commercial use, there has been a long term need to provide frozen potato patties which can retain considerably more of the potato flavor than the prior potato patties and moreover to provide potato patties which can not only be final cooked by baking, deep frying and grilling but also by heating in a microwave oven and toasting in a conventional toaster. The potato patties of the invention satisfy these needs.

SUMMARY OF THE INVENTION

This invention relates to a method of forming an improved potato patty which can be final cooked in a wide variety of ways yet maintains a substantial portion of the natural potato flavor. The potato patty made in accordance with the invention remains intact through the preparation thereof and the final cooking and exhibits excellent taste and texture after the final cooking.

In accordance with the invention, relatively large chunks of potatoes preferably having a minimum dimension of not less than about ¼ inch are blanched (cooked) in water or steam, optionally surface dried, oil blanched, mixed with an aqueous solution of starch or gums which act as binders, formed into patties, and then frozen. Preferably, the patties are formed while the potato chunks are still warm from the oil blanching.

The aqueous starch or gum solution is used to hold the potatoes chunks together to form the patties and to maintain their integrity through manufacture and final cooking. In a preferred embodiment, a mixture of starches are used to provide a larger temperature range over which the starch binding is effective. In this manner, the potato patties retain their shape throughout their processing and final cooking and result in a significant improvement in recovery rates.

The patties of the present invention can be readily cooked by conventional methods such as baking, grilling and deep frying and, moreover, can be final cooked by microwave radiation without becoming rubbery and also by toasting without exceeding excessive amounts of oil. In the latter two instances, it is preferred to cook the patties in oil before final freezing.

When final cooked, the potato patties of the invention retain considerably more of the natural potato taste and texture than the prior potato patties notwithstanding how the potato patties are final cooked. These and other features and advantages of the present invention will become more apparent from the following detailed discussion.

DESCRIPTION OF A PREFERRED EMBODIMENT

Figure 1:
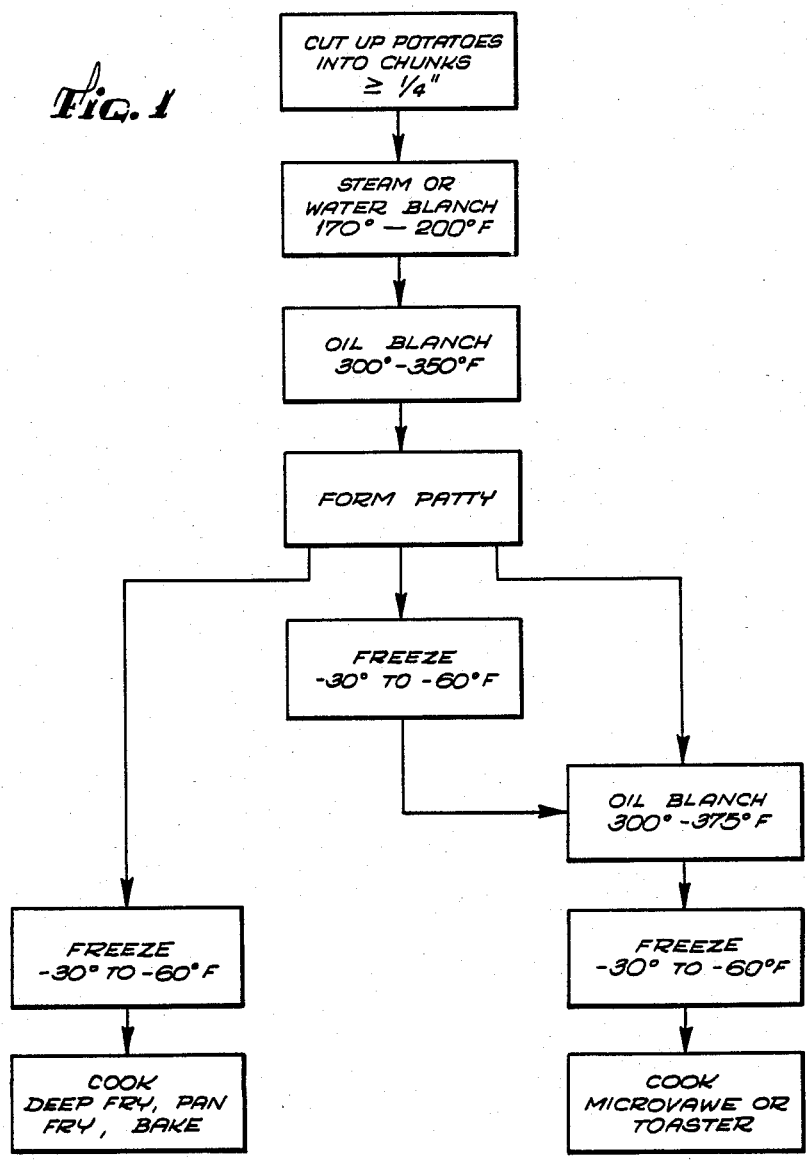
FIG. 1 is a box flow diagram illustrating processing steps which embody features of the invention.

The process of forming frozen potato patties in accordance with the invention comprises cutting up peeled or unpeeled potatoes into relatively large sized chunks which predominantly have a minimum dimension of not less than ¼ inch. Maximum dimensions of the chunks are much less important than the minimum dimension but the maximum should not be more than the thickness of the patty.

The potato chunks are steamed or water blanched at a temperature typically of about 170° to 220° F. for about 2 to 20 minutes. To prevent discoloration of the potatoes, sodium acid pyrophosphate may be added to the aqueous medium in amounts of about 0.05 to 0.25% (by weight). To provide a golden brown color to the final cooked product dextrose may be also normally added to the aqueous media in amounts of up to about 2%.

The water or steam cooked potato chunks are usually surface dried at a temperature of about 120° to 180° F. to prevent excessive amounts of water from entering the hot oil bath subsequently used to oil blanch or pan fry the potato chunks. The time for drying varies depending upon the size of the chunk but usually is less than two minutes.

The water or steam blanched potato chunks are oil blanched by submerging the potato chunks into an oil bath at a temperature of about 300° to 375° F. preferably about 320° F. to 370° F., for about 0.25 to 2 minutes, preferably about 0.5 to 1.5 minutes depending upon the size of the potato chunks.

The oil blanched potato chunks are drained to remove excessive oil on the surface thereof and then mixed with an aqueous solution of starch or gum or mixture thereof and formed into a potato patty. The aqueous starch or gum solution contains about 3 to 25% (by weight), preferably about 5 to 12% (by weight), of starch or gum and is added to the oil blanched potato chunks at a rate of about 5 to 20 grams of starch or gum solution per 100 grams of potatoes. A wide variety of starches and gums may be used as binders. Suitable starches include Instant Clear Jel and Instant Pure Flo sold by the National Starch Company and Hi-Jel 90 and Instant Tender-Jel 434 sold by the Staley Company, all comprising instant pregelatinized starches which, when mixed with water, yield a relatively viscous and substantially clear binder composition. These specific starches constitute waxy corn starch, except for the Hi-Jel starch which is a tapioca starch.

After forming the potato chunks into patties they are then frozen in a conventional manner at a temperature of about −30° to −60° F. The frozen patties can then be stored indefinitely.

For potato patties which are to be final cooked by microwave radiation or toasting, it is preferred to oil blanch the potato patty after forming into a patty but before the final freezing with the oil blanch temperature ranging from about 325° to 380° F., preferably about 350°° to 370° F. for about one to four minutes, preferably about 1.5 to 3 minutes. If the processing line has only one oil blanching station, it may be desirable to freeze the patty after forming, subsequently oil blanching the patty at the above times and temperatures and then refreezing the patty for subsequent storage.

The conditions for final cooking of the frozen potato patty vary considerably depending upon the size of the patty, but in general for patties approximately ½ inch thick the following conditions have been found to provide excellent results both as to taste and texture integrity of the patty.

| Method of Heating | Final Cooking Conditions | |
|---|---|---|
| | Temperature (°F.) | Time (Minutes) |
| Deep fry | 340–375° | 2–3 |
| Oven bake | 375–425° | 10–25 |
| Grill | 350–375° | 5–8 (per side) |
| Toast | | 3–5 |
| Microwave | 650 watt | 1–2 |

Figure 2:
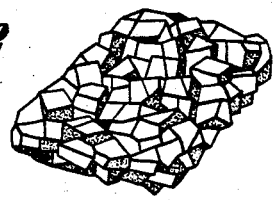
FIG. 2 is a perspective view of a potato patty formed in accordance with an embodiment of the invention.

FIG. 1 illustrates flow diagrams of various processing steps which are suitable for use in the process of the invention. FIG. 2 is a perspective view of a potato patty formed in accordance with the invention.

The following examples are provided to further describe the processes and products which embody features of the present invention.

EXAMPLE 1

Potato chunks ¼ by ½ inch by ½ inch were blanched in water at a temperature of about 180° for about five minutes, surface dried by heating at about 150° F. for about 40 seconds, then oil blanched at a temperature of about 350° for about 45 seconds. The oil blanched chunks were mixed with an aqueous solution of Instant Pure-Flo starch at a concentration of about 8% (by weight) and mixed with the oil blanched potato chunks at a rate of about 10 grams of solution per 100 grams of potatoes. The potato starch mixture was formed into patties and then frozen at a temperature of −40° F. The frozen patties were subsequently final cooked by heating in an oven at 400° F. for 18 minutes, by grilling at 375° F. on each side for six minutes or by deep frying at 350° F. for 2.25 minutes. In each case, the potato patty remained intact throughout the final cooking and exhibited excellent taste and texture.

EXAMPLE 2

Potato chunks ¼ inch by ½ inch by ½ inch were prepared in the manner set forth in Example 1 except that, after freezing, the patties were oil blanched for about 2.25 minutes at 360° F. and then refrozen at −40° F. The patties were finally cooked by deep frying at 350° F. for 2.25 minutes, by oven baking at 400° F. for 14 minutes, by grilling at 365° F. for five minutes on each side, by toasting for 4.25 minutes or by microwave radiation heating (650 watts) for about 1.5 minutes. All the patties remained intact during the final cooking process and exhibited excellent taste and texture. After microwave radiation treatment, the patties were not the least bit rubbery and essentially no oil dripped from the patties while they were being toasted.

EXAMPLE 3

Potato chunks ¼ inch by ½ inch by ½ inch were prepared in the manner set forth in Example 1 except that after the patties were formed, they were oil blanched at 360° F. for 2.25 minutes then frozen in −40° F. The frozen patties were then final cooked in a manner described in example 2. All of the patties remained intact during the final cooking process and exhibited excellent taste and texture. The patties that were final cooked by microwave radiation were not the least bit rubber and the patties which were toasted showed little or no oil dripping during toasting.

As is evident from the above, the process of the present invention provides a relatively straight-forward process which provides a high quality frozen potato patty that has excellent taste and texture, a low oil content and excellent handling characteristics throughout processing and final cooking. Other advantages have also been found. For example, the frozen patties can be broken up while being grilled to form excellent tasting hash browned potatoes. Moreover, other modifications and improvements can be made to the invention without departing from the scope thereof.

I claim:

1. A method of preparing a potato patty for freezing and storage comprising:
   a. cutting up potatoes into relatively large chunks having a predominant minimum dimension of not less than about ¼ inch;
   b. cooking the potato chunks in an aqueous media selected from the group consisting of steam and water;
   c. further cooking the potato chunks in oil;
   d. mixing the potato chunks cooked in oil with an aqueous solution of starch, gum or mixtures thereof; and
   e. then forming the mixture into a potato patty.

2. The method of claim 1 including the step of freezing the formed patty.

3. The method of claim 2 including the steps of cooking the frozen patty in oil and then freezing the patty.

4. The frozen potato patty prepared by the method of claim 3.

5. The method of claim 3 including the step of final cooking the frozen potato patty by a method selected from the group consisting of microwave heating or toasting.

6. The potato patty prepared by the method of claim 5.

7. The method of claim 2 wherein the formed patty is frozen at a temperature from about −30° to −60° F.

8. The frozen potato patty prepared by the method of claim 7.

9. The frozen potato patty prepared by the method of claim 2.

10. The method of claim 2 including the step of final cooking the frozen potato patty by a method selected from the group consisting of:
   a. baking at a temperature from about 375° to 425° F.;
   b. grilling at a temperature from about 350° to 375° F.;
   c. deep frying at a temperature from about 340° to 375° F.;

d. microwave heating; and
e. toasting.

11. The potato patty prepared by the method of claim 10.

12. The method of claim 1 including the steps of cooking the formed patty in oil and then freezing the patty.

13. The frozen potato patty prepared by the method of claim 12.

14. The method of claim 12 including the step of final cooking the frozen potato patty by a method selected from the group consisting of microwave heating or toasting.

15. The potato patty prepared by the method of claim 14.

16. The method of claim 1 wherein the potato chunks are cooked in an aqueous medium at a temperature from about 170° to 220° F.

17. The method of claim 1 wherein the potato chunks are cooked in oil at a temperature from about 300° to 375° F.

18. The method of claim 1 wherein the potato chunks are cooked in oil at a temperature from about 320° to 370° F.

19. A method of preparing a frozen potato patty comprising:

a. cutting up potatoes into relatively large chunks with the minimum dimensions of such chunks being predominantly at least ¼ inch;
b. cooking the potato chunks in an aqueous medium at a temperature from about 170° to 220° F. for about 2 to 20 minutes;
c. further cooking the potato chunks in an oil at a temperature from about 300° to 375° F. for about 0.25 to 2 minutes;
d. mixing the potato chunks cooked in oil with an aqueous solution of starch, gum or mixtures thereof;
e. forming the potato chunks in a potato patty; and then
f. freezing the potato patty at a temperature of about −30° to −60° F.

20. The method of claim 19 wherein the aqueous solution of starch, gum or mixtures thereof contains from about 3 to 25% by weight of starch or gum or mixtures thereof.

21. The method of claim 20 wherein the aqueous solution of starch, gum or mixtures thereof is mixed with the oil cooked potato chunks at a rate to provide from about 5 to 20 grams of starch, gum or mixtures thereof per 100 grams of potato chunks.

22. The method of claim 19 wherein the potato chunks cooked in the aqueous medium are surface dried at a temperature of about 120° to 180° F.

23. The frozen potato patty prepared by the method of claim 19.

* * * * *